United States Patent [19]

Gebauer et al.

[11] Patent Number: 5,306,122
[45] Date of Patent: Apr. 26, 1994

[54] DIAPHRAGM PUMP CONSTRUCTION

[75] Inventors: Gerhard Gebauer, Bermatingen; Wilfried Goes, Meersburg; Otto Rosenauer, Langenargen, all of Fed. Rep. of Germany

[73] Assignee: J. Wagner GmbH, Fed. Rep. of Germany

[21] Appl. No.: 934,352

[22] Filed: Aug. 21, 1992

Related U.S. Application Data

[62] Division of Ser. No. 573,626, Aug. 27, 1990, Pat. No. 5,192,198.

[30] Foreign Application Priority Data

Aug. 31, 1989 [DE] Fed. Rep. of Germany ....... 3928949

[51] Int. Cl.⁵ .................. F04B 43/06; F16K 15/18
[52] U.S. Cl. .................. 417/383; 417/446; 137/522
[58] Field of Search ........... 417/388, 383, 234, 446; 251/54; 137/522

[56] References Cited

U.S. PATENT DOCUMENTS

| Re. 29,055 | 11/1976 | Wagner | 417/388 |
|---|---|---|---|
| 865,151 | 9/1907 | Andrew | 417/446 |
| 1,946,882 | 2/1934 | Russel | 137/901 |
| 2,528,822 | 11/1950 | Dunn | 251/54 |
| 2,578,746 | 12/1951 | Scherger | 417/383 |
| 2,902,936 | 9/1959 | Bradley | 417/383 |
| 3,001,538 | 9/1961 | Bois | 137/901 |
| 3,086,550 | 4/1963 | Cummings | 92/98 R |
| 3,254,845 | 6/1966 | Schlosser | 239/332 |
| 3,263,614 | 8/1966 | Kemp | 417/386 |
| 3,351,088 | 11/1967 | Jensen | 92/98.4 R |
| 3,367,270 | 2/1968 | Schlosser | 103/44 |
| 3,612,727 | 10/1971 | Drake | 407/388 |
| 3,623,661 | 11/1971 | Wagner | 239/127 |
| 4,390,159 | 6/1983 | Duncan | 137/901 |
| 4,403,924 | 9/1983 | Gebauer et al. | 417/388 |
| 4,416,588 | 11/1983 | Karliner | 417/199 |
| 4,558,587 | 12/1985 | Fruzzetti | 137/901 |
| 4,573,885 | 3/1986 | Peterson | 417/383 |
| 4,785,719 | 11/1988 | Bachschmid et al. | 92/95 |
| 4,828,464 | 5/1989 | Maier et al. | 417/388 |
| 4,960,038 | 10/1990 | Chiba et al. | 92/98 R |
| 5,067,517 | 11/1991 | Ting-Chih et al. | 137/901 |
| 5,067,518 | 11/1991 | Kosmyna | 137/522 |

FOREIGN PATENT DOCUMENTS

| 603243 | 8/1960 | Canada | 417/446 |
|---|---|---|---|
| 725659 | 8/1942 | Fed. Rep. of Germany . | |
| 1503390 | 1/1970 | Fed. Rep. of Germany . | |
| 3018687C2 | 12/1981 | Fed. Rep. of Germany . | |
| 3027314A1 | 2/1982 | Fed. Rep. of Germany . | |
| 816241 | 7/1959 | United Kingdom | 417/446 |

OTHER PUBLICATIONS

Wagner Gold Power 2500 brochure and Owner's Manual.

Primary Examiner—Richard A. Bertsch
Assistant Examiner—Peter Korytnyk
Attorney, Agent, or Firm—Hill, Steadman & Simpson

[57] ABSTRACT

A diaphragm pump with a flat diaphragm which is held between the face surface of a pump head and the corresponding face surface of a hydraulic block is improved in that the annular clamping region has an angling step such that the clamped-in diaphragm is bent in its outer annular border region. In this way, a sealed tightness is achieved over long time periods, as well as inducing a uniform diaphragm tension which effects performance of the pump advantageously. Inventive valve designs are provided which allow removal for cleaning from outside the assembled pump and also allows manual /pening of the valves for unclogging. An efficient design is provided for a pump head.

11 Claims, 5 Drawing Sheets

DIAPHRAGM PUMP CONSTRUCTION

This is a division of application Ser. No. 573,626, filed Aug. 27, 1990.

BACKGROUND OF THE INVENTION

Field of the Invention

The invention relates to a diaphragm pump with a hydraulic component, a pump head and a flat diaphragm which is clamped between facing border regions or faces of the hydraulic component and the pump head. The pump head comprises a paint chamber bordering the diaphragm having paint inlet and outlet valves. The hydraulic component comprises a piston or ram oscillating in a direction normal to a plane of the diaphragm and acting on a propulsion fluid which fills a propulsion chamber located between a piston front and the diaphragm. Such diaphragm pumps have been known and have been on the market for a long time.

In the case of these known diaphragm pumps, the diaphragm is clamped between the flat face edges of the pump head and the hydraulic block. It has the disadvantage that when the axial bracing or damping tightness between the pump head and the hydraulic block decreases, the clamped-in diaphragm becomes permeable or by-passable very rapidly and leads to considerable washouts of the flow in one of the two parts of the pump. Although sealing channels integrated in both housing parts are a certain improvement, it is necessary after comparatively short operating times of the pump to take off the pump head in order to either exchange the diaphragm and/or the mentioned border regions of the two pump parts.

SUMMARY OF THE INVENTION

Therefore, it is an object of the present invention to improve a diaphragm pump of the initially mentioned type such that a long lasting tightness of a clamp-in region of the diaphragm is guaranteed and thus, the pump must only be taken apart after considerably longer operating times. The solution of this problem results from the inventive feature that facing edges or faces of the pump head and the hydraulic component are provided with corresponding bends which form a circular step, bending and clamping an outer circular edge of the diaphragm.

Due to the long operating times that can be achieved with the invention without taking apart the pump and thus also without cleaning the paint valves, it is possible that these valves gum up due to certain paints and/or insufficient cleaning. In order to avoid the gumming up of the paint valves, the diaphragm pump must be taken apart often times despite being tight. To solve this disadvantage, the paint valves are fashioned according to expedient embodiments of the invention such that possible clog-ups can be removed from the outside. The valves are designed to be removable from the outside. The inlet and outlet valves have manually activated mechanisms which are accessible from outside the pumps to open up the valves for cleaning such as by forward or reverse flow.

DESCRIPTION OF THE PREFERRED EMBODIMENTS

Figure 1:
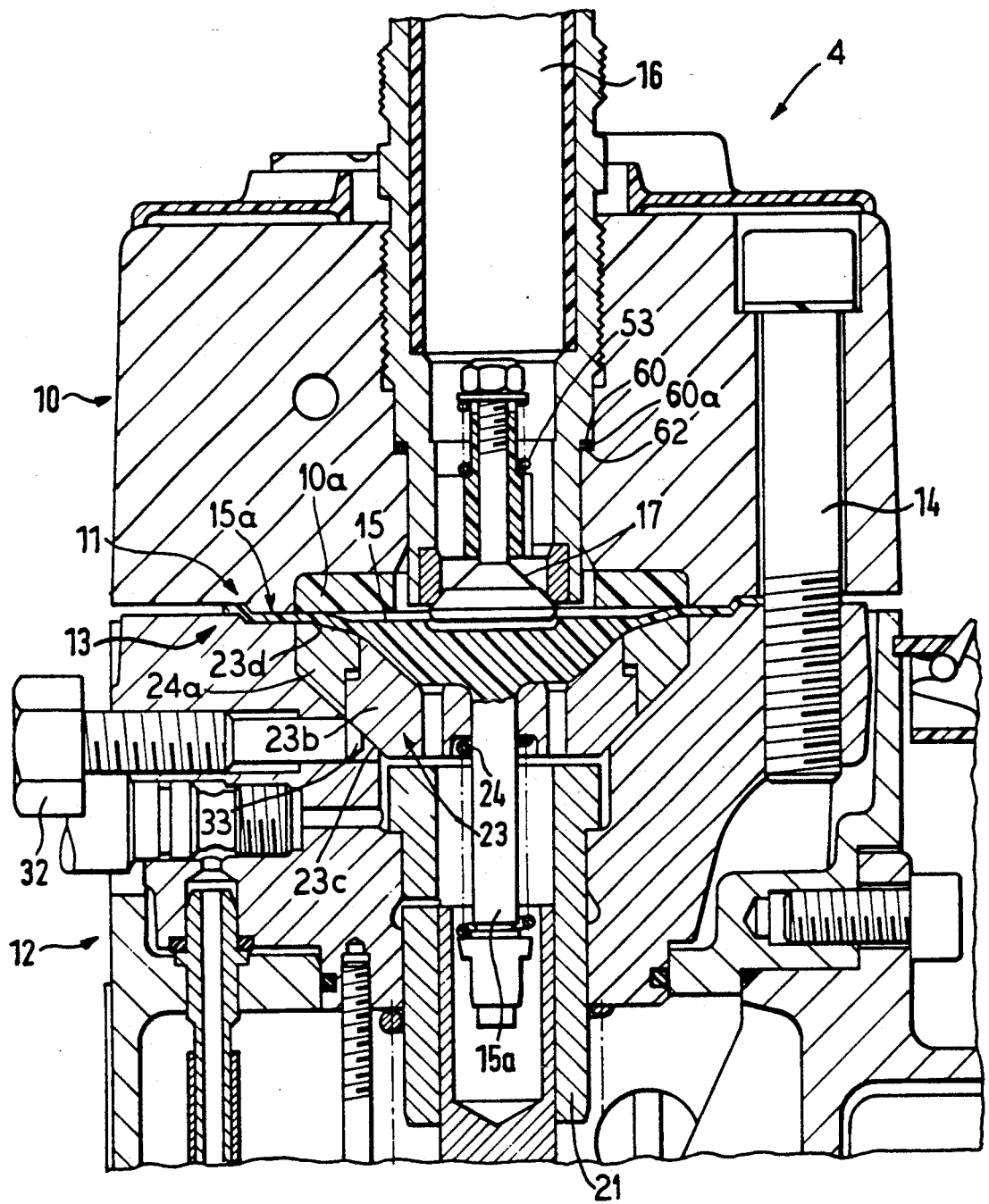
FIG. 1 is a partial section through a diaphragm pump, including a pump head and an adjacent hydraulic component.

According to FIG. 1, a diaphragm pump 4 has a first compartment means such as a pump head 10 with an annular border region 11 and a second compartment means such as a hydraulic block 12 with an annular face 13. The pump head 10 and the hydraulic block 12 are assembled together by means of screws 14, 7hereby between the pump head 10 and the hydraulic block 12, a diaphragm 15 is inserted whose outer annular periphery or peripheral clamping region 15a is clamped between the annular border region 11 and the annular face 13 as it will be explained later in detail. The pump head 10 is centrally penetrated by an inlet valve 16 whose valve cone 17 is arranged centrally above the diaphragm 15, shown in FIG. 1, such that above the diaphragm 15 a flat paint chamber 18 results.

Figure 2:
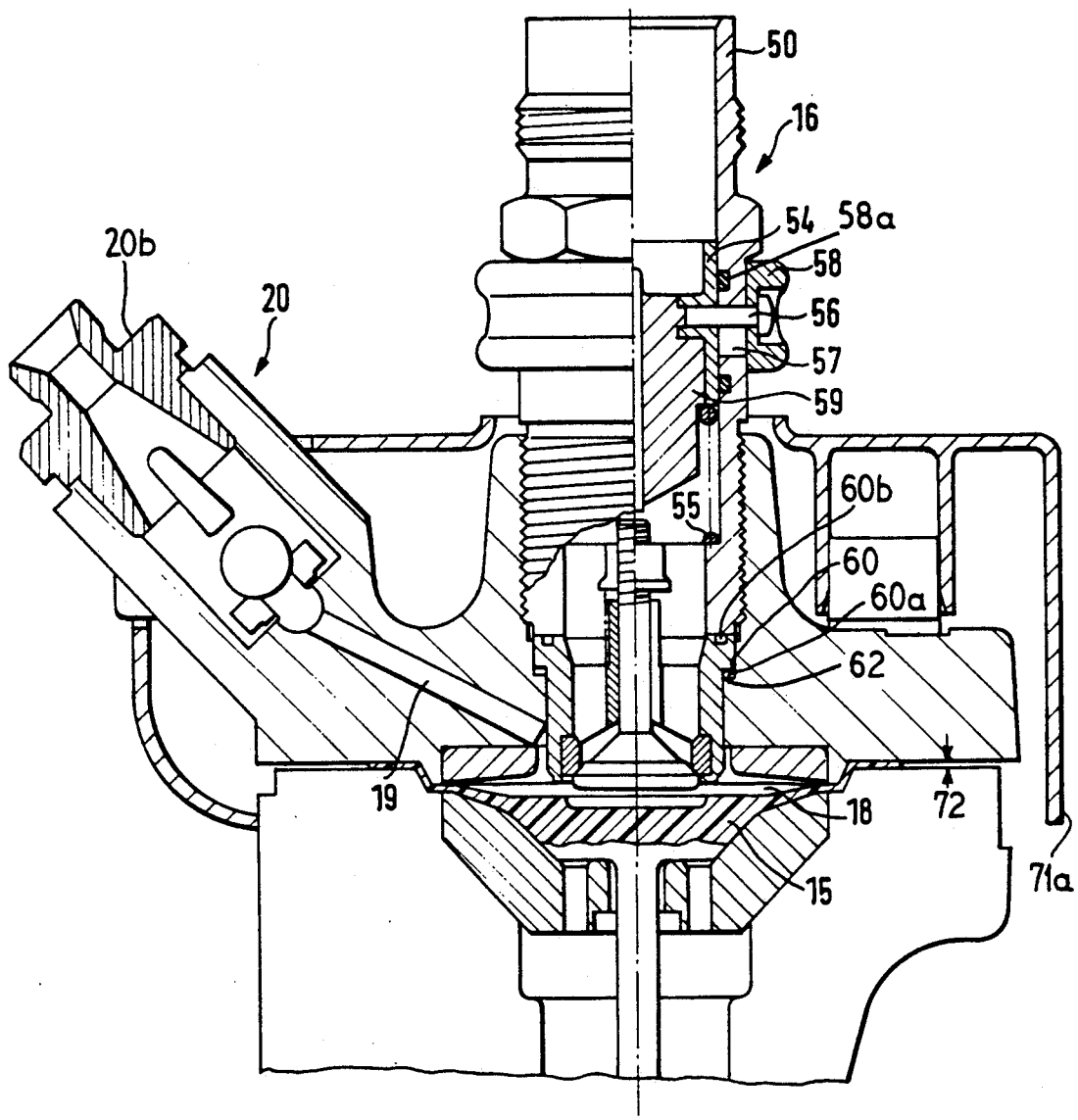
FIG. 2 is a partial section through the diaphragm pump of FIG. 1; however in a plane turned by 90°.

As revealed in FIG. 2, an outlet channel 19 goes out from this paint chamber 18, the outlet channel 19 leading to a paint outlet valve 20 penetrating into the pump head 10. The hydraulic block 12 holds centrally therein a ram or piston 21 which is driven by an eccentric not visible in the drawings. As shown more clearly in FIG. 3, between an upper front face 21a of the piston 21 and a bottom side of the diaphragm 15, a propulsion chamber 22 is fashioned which is filled with hydraulic fluid. A support insert 23 is arranged in the hydraulic block 12, which serves for supporting the diaphragm 15. The support insert 23 has holes 23a to pass propulsion fluid from the propulsion chamber 22 to the diaphragm 15. The diaphragm 15, whose axial prolongation or stem 15a projects through a central boring of the support insert 23, is loaded by a spring 24 such that the diaphragm 15 presses against the support insert 23 given a lack of pressure in the propulsion chamber 22, which diaphragm position is described as bottom dead center or UT.

The above explained basic construction corresponds to the usual diaphragm pumps. In short, the function is such that given a movement stroke of the ram 21 towards the bottom of the hydraulic part, oriented as shown in FIG. 1, during a suction-stroke, the diaphragm 15 also moves towards the bottom due to the spring 24 and lays itself against the support insert 23 at UT, during which the inlet valve 16 opens and paint enters into the paint chamber 18. When the ram 21 moves back toward the top of the hydraulic part, during a pressure-stroke, the propulsion fluid located in the chamber 22 presses the diaphragm 15 toward the pump head 10 so that it eventually presses against the bottom /f the pump head 10, which is characterized for the diaphragm as OT or upper dead center, with the consequence that the paint located in the chamber 18 is pressed through the outlet channel 19 and the outlet valve 20 and into a conveyor line (not shown) which can be attached to paint equipment.

Figure 3:
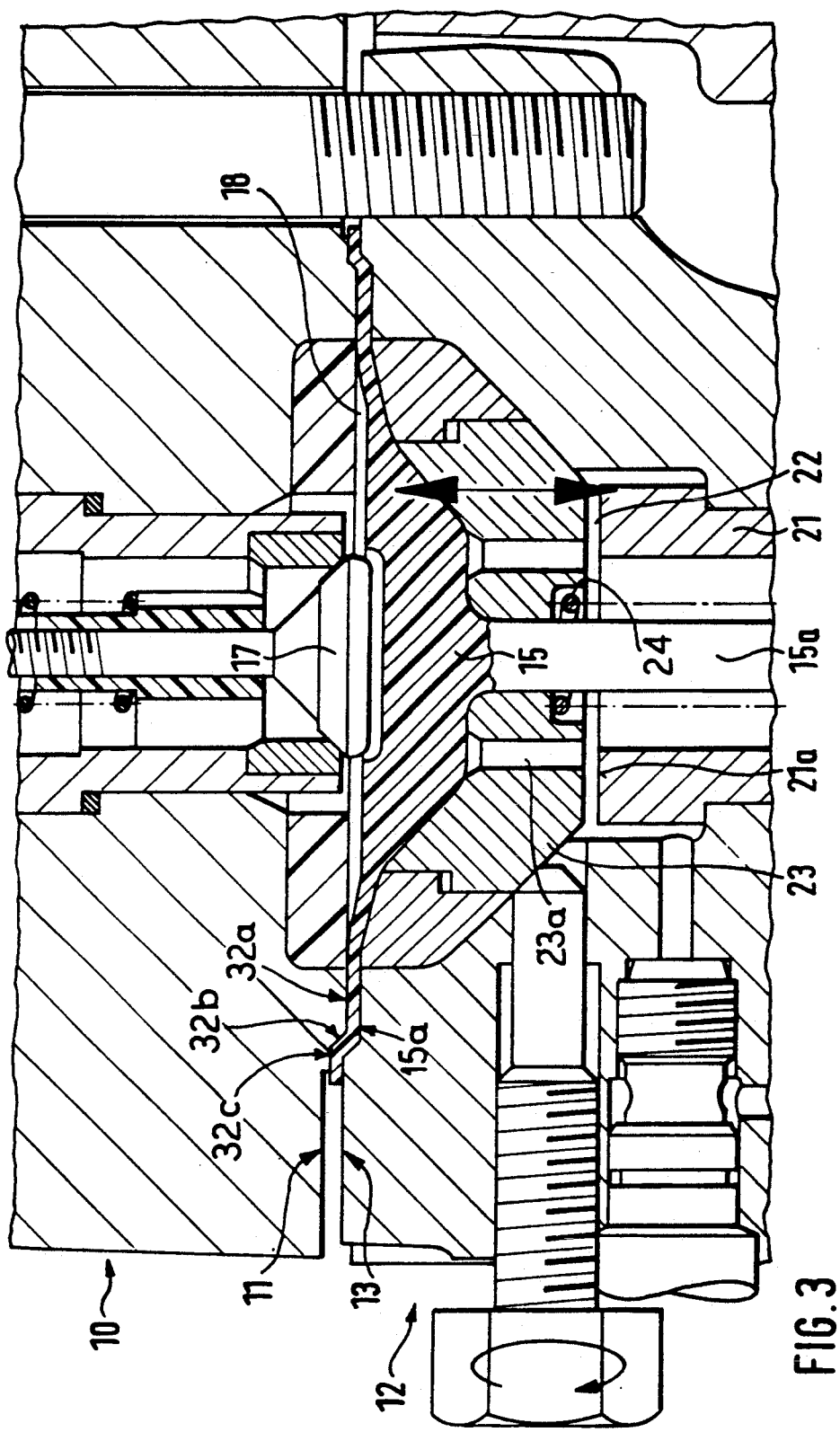
FIG. 3 is an enlarged cutout of FIG. 1.
Figure 4:
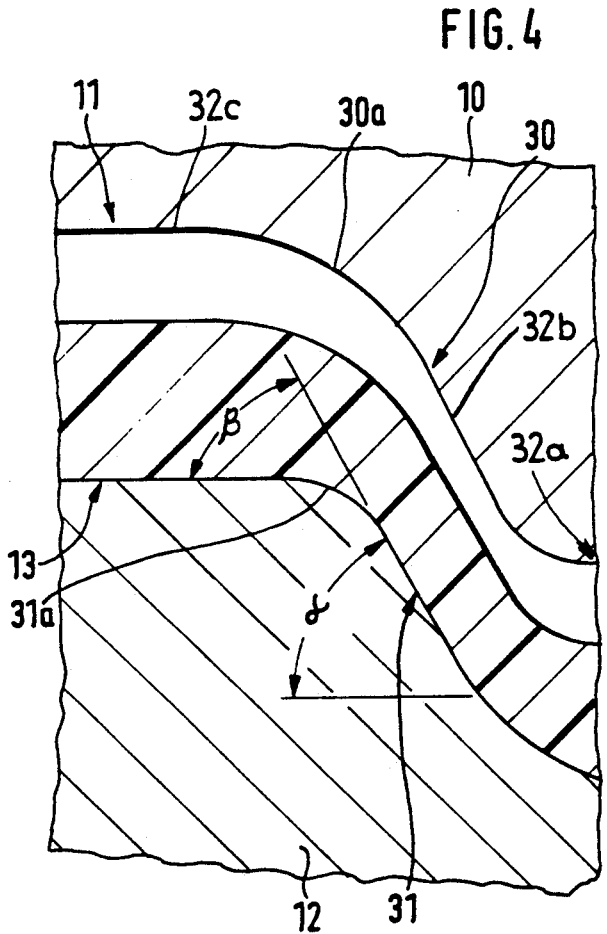
FIG. 4 is a further enlarged cutout of FIG. 3.

As best seen in FIGS. 3 and 4, the annular region 11 and the annular face 13 of the pump head 10 and the hydraulic block 12 respectively, in facing relationship, have a first and second stepped profile 30, 31 respectively which comprise a plurality of contiguous peripheral areas arranged planarly angled as described below. The stepped profiles are fashioned corresponding to each other, i.e., in parallel planar fashion. A step angle $\alpha$ relative to the horizontal line, as oriented in FIG. 4, is to lie between 60° and 80°, preferably at approx. 65°. A step depth can be 2.5 to 3.5 mm. The diaphragm is bent when clamped between these stepping profiles 30, 31.

As seen from the central axis of the diaphragm 15 outwardly in FIGS. 3 and 4, the stepped profile 30, 31 clamping the outer annular periphery 15a of the diaphragm, or clamp-in region, has three possible subregions: first is a first region or a flat clamping region 32a whose length is approx. 3 to 5 mm, then a second region or an angled clamping region 32b and possibly a third region or an outer flat clamping region 32c. The first and second stepped profiles 30, 31 are located at such a place that the outer annular periphery 15a of the diaphragm is seized by the stepped profiles 30, 31, whereby the diaphragm can in fact end at ends 30a, 31a of the angled clamping regions 32b respectfully, without the diaphragm extending into the outer flat region 32c. Due to the bending of the diaphragm 15 in the clamp-in region 15a, a sealing function is achieved that is insensitive to flow or weakening of the screwed forces or clamping forces due to frequent temperature changes, such as frequent switching between an operating condition ON and an operating condition OFF. The number of the possible operating hours of the diaphragm pumps increases without exchanging the diaphragm due to permeability or bypassing or washouts of the annular periphery 15a and without redoing the annular border region 11 or the annular face 13 or replacing the pump head and/or the hydraulic block.

The step angle $\alpha$ is shown as the included acute angle between the angled clamping region 32b and the flat clamping region 32a. In the preferred embodiment, a second included acute angle $\beta$ between the angled clamping region 32b and the outer flat clamping region 32c, is shown in FIG. 4 to be equal to $\alpha$, the two flat regions 32a, 32c being substantially planarly parallel. However, this need not be so, the second acute include angle $\beta$ between the angled clamping region 32b and the outer flat clamping region 32c, being different from $\alpha$, is encompassed by the invention.

This angled clamping of the diaphragm also influences the suction behavior during the ventilation of the pump, i.e. when the paint chamber 18 is filled with paint for the first time. If the diaphragm 15 has a naturally flat shaped outer annular edge region in the clamping region, and is laid on one of either the annular border region 11 or the annular face 13 of the pump head or the hydraulic block respectively, whereby the diaphragm 15 is pressed by the spring 24 against the support insert 23 determining the UT, and then the respective other one of the annular region 11 or the annular face 13, is applied and the screw coupling between the pump head 10 and the hydraulic block 12 performed, a uniform, ring-shaped tensile stress on the diaphragm 15 is generated due to the bending of the diaphragm in the diaphragm clamp-in region with the consequence that, against the force of the spring 24, the diaphragm 15 is slightly lifted from the support insert 23 toward the top and thus out of its UT. When the operation of the diaphragm pump is started, the diaphragm 15 thus performs its oscillating travel more in an upper stroke region, i.e. in a stroke region which is limited by a point above the UT and the OT or upper dead center. Due to this feature, the paint chamber 18, which is first filled with air, is kept comparatively small which noticeably simplifies the intake of paint, even heavy paint. When the paint chamber 18 is completely filled with paint, whereby a corresponding pressure can build up, the membrane 15 performs its full stroke from the UT to a point shortly before the OT, i.e. the diaphragm movement is now more shifted towards the UT. Simultaneously, the uniform ring-shaped tensile stress prevailing in the diaphragm 15 has an effect on the expulsion of the paint from the outlet valve 20, thus supporting the hydraulic power end so that the pump efficiency is additionally improved particularly when heavy paint is output.

FIG. 4 shows that the pump head 10 and the hydraulic block 12 are fashioned not only so that an undular form of diaphragm clamping is achieved but that the regions 32a, 32b and 32c are dimensioned and shaped so that a distance between the matching stepped profiles 30, 31 in the region 32b is narrower than a distance between pump head 10 and hydraulic block 12 within the regions 32a and 32c. This results in a greater pressing force and a better sealing effect. Additionally, a decrease in clamping pressure caused, for example, by lessening of the screw forces has a far less detrimental effect in the region 32b between stepped profiles 30, 31, because of its angular orientation.

FIG. 1 shows that an adjustment screw 32 is inserted in the hydraulic block 12 in crosswise fashion, having a first end projecting out of the hydraulic block for adjustment, and having a second end engaging the support insert 23. With this adjusting screw 32 the support insert 23 can be manually axially moved toward the top or bottom of FIG. 1, from the outside. This provides the possibility to change the UT position of the diaphragm 15 and to perform an adaptation of the diaphragm-stroke region in a most simple manner in order to thus simplify—corresponding to the above explanations—the filling event and/or to perform an adjustment for the viscosity of the paint to be pumped.

The support insert 23 comprises an outer support ring 24a engaged peripherally by an inner support ring 23b. The inner support ring 23b provides an inclined surface 23c which is abutted by a distal end inclined surface 33 of the adjusting screw 32. By protruding the adjusting screw 32 inwardly, the inner support ring 24a moves toward the diaphragm 15, engaging the outer support ring 24a to clamp progressively the inside peripheral areas of the diaphragm 15 against an annular support plate 10a arranged above the diaphragm 15. Because the outer support ring 24a has an inwardly inclined abutting surface 23d facing the diaphragm 15, translation of the outer support ring 24a toward the diaphragm 15 will thereby clamp progressively larger peripheral annular areas of the diaphragm 15 having progressively smaller central circular openings against the annular support plate 10a. Thus, by adjusting the support insert 23 with the adjusting screw 32 the unclamped span of the diaphragm can be changed and the stroke or tension of the diaphragm 15 can be adjusted.

The above measures allow the diaphragm pump 4 of the invention to be operated for a long time without the necessity to take apart the pump, i.e. to take off the pump head 10, in order to exchange the diaphragm or to change the stroke region of the diaphragm. Another advantage of the invention, however, is that in the case of the known diaphragm pumps, the pump head 10 must be taken off frequently because the paint valves can clog up, for example, by the deposition of solid matter particles contained in the paint, such as metal varnish. Another inventive feature of the invention is that the paint valves can be unclogged without having to remove the pump head 10.

Figure 5:
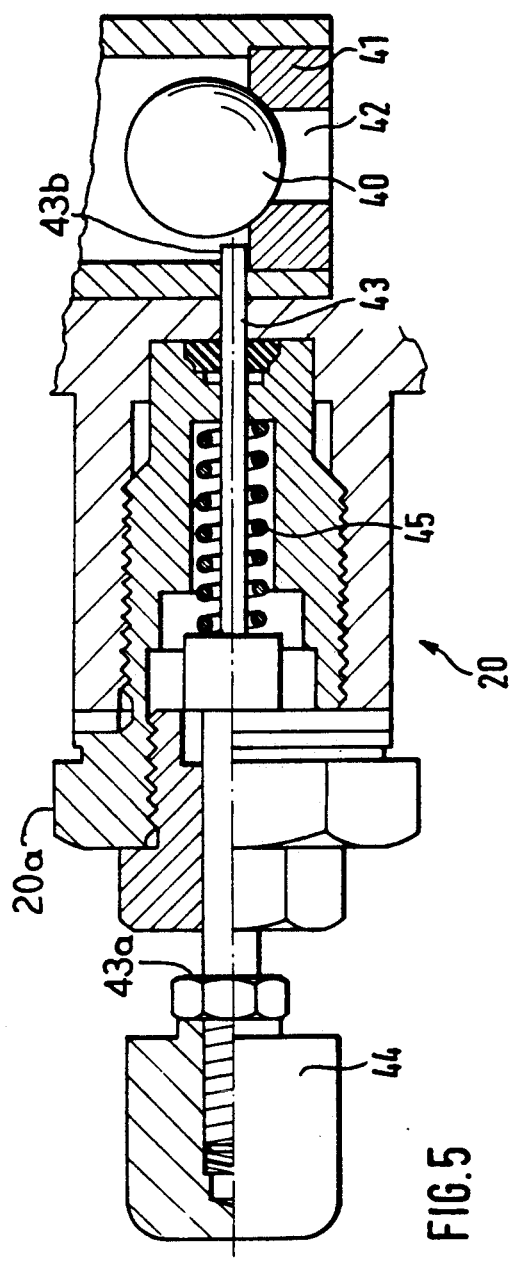
FIG. 5 is a section through one outlet valve.

FIG. 5 shows the paint outlet valve 20 in detail. The valve 20 has a poppet ball 40 which is pressed by a valve spring (not shown) against a valve seat 41. During the pressure stroke of the diaphragm pump the poppet ball 40 is lifted by the paint coming under high pressure at 42 against the force of the valve spring, that is the valve is opened. During the suction stroke of the diaphragm pump the valve spring presses the ball 40 against the valve seat 41, that is, it closes the valve. According to the invention, the outlet valve 20 is provided with a channel or guide in which a valve lifter 43 is carried in sealing fashion. At a remote end 43a, the valve lifter 43 projects out of a valve housing 20a and is there provided with an actuation button 44. The opposite end 43b of the valve lifter is facing the poppet ball 40 whereby the axis of the valve lifter is arranged such that it is tangent with the ball below the transverse axis of the ball, i.e., closer to the valve seat 41. A screw spring 45 surrounding the valve lifter 43 exerts a force on the valve lifter in the direction away from the ball 40. If, however, the button 44 is pressed in, the valve lifter 43 is shifted towards and against the ball 40 against the force of the screw spring 45. Upon further movement of the bottom 44, the valve lifter 43 lifts the spring-loaded poppet ball 40 from its seat 41, whereby possibly existing clog-ups can be loosened physically or by forward or backward flow through the valve. This design of the outlet valve 20 thereby has the advantage that easy access to the valve lifter 43 exists outside of a flow region. Also, FIG. 2 shows that the ball 40 can be removed for cleaning from the outside by removing a nozzle portion 20b of the outlet valve 20.

Figure 6A:
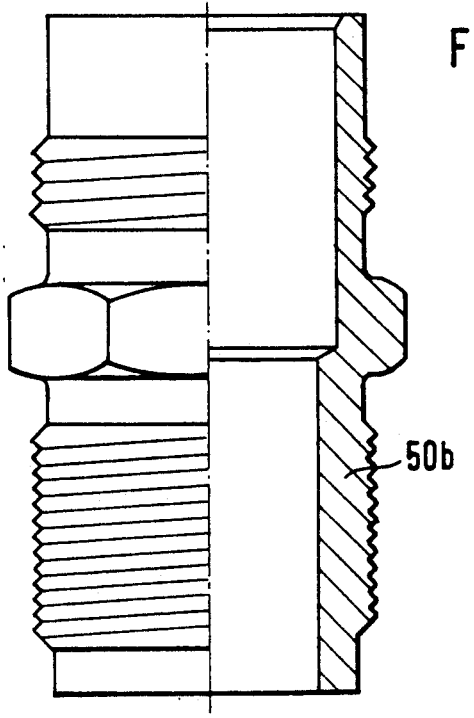
FIGS. 6A and 6B, are sections through a two-piece inlet valve.
Figure 6B:
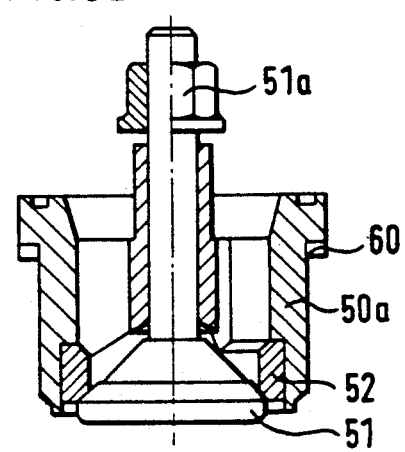

The FIGS. 2, 6A and 6B show a construction of the inlet valve 16. This inlet valve 16 has a cylindrical housing composed of a bottom housing part 50a and a upper housing part 50b. The bottom housing part 50a accommodates a valve poppet 51 with a valve shaft 51a, a valve seat 52 and a valve spring 53 stressing the valve poppet 51 against the valve seat 52. The valve spring 53 is shown in its proper orientation in FIG. 1. In the upper housing part 50b, an axially displaceable sleeve 54 is located which is biased by a sleeve spring 55 in the direction toward the top. The sleeve 54 has a pin 56 projecting from its circumference towards the outside, this pin going through a longitudinal cut or slot 57 of the housing part 50b and fastened at a sliding ring 58, which sits on the housing part 50b in slidable fashion. Finally, the sleeve 54 has a fin or rib 59 projecting towards the inside whose free end is located above the upper end of the valve shaft 51a. In the condition shown in FIG. 2, the rib 59 does not influence the function of the valve. If, however, the ring 58 is pressed downward in a sliding fashion, the ring 58 moves the sleeve 54 via the pin 56, against the force of the sleeve spring 55, towards the bottom, so that the rib 59 hits the upper end of the valve shaft 51a, moving the shaft downward and opening the valve 16. As soon as the ring 58 is released, the valve can close again with the sleeve 54 returning to its natural position. A sealing ring or gasket 58a is provided to prevent paint leakage or dripping out of the slot 57.

The insertion of the inlet valve 16 into the pump head ensues in the manner that first the bottom housing part 50a, containing the valve seat 52, and the valve poppet 51, the valve shaft 51a, and the valve spring 53 in assembled fashion are inserted into a corresponding boring of the pump head whereby a shoulder 60 of the housing part 50a presses against a corresponding shoulder 62 of the pump head boring. Thereupon the upper housing part 50b of the inlet valve 16 provided with the above described sliding ring 58 and cooperating parts is screwed by means of threads into the boring of the pump head, the upper housing part 50b having fashioned thereon an integral nut around its upper end, until it reaches with its front face area the bottom housing part 50a and braces it against the pump head, the shoulder 60 against the corresponding shoulder 62. A sealing between the shoulders 60, 62 ensues via a first sealing ring 60a. A sealing between the bottom housing part 50a and the upper housing part 50b ensues via a second sealing ring 60b. The advantage of such a two-piece embodiment of the inlet valve 16 is that in the case of repairs or replacement parts the costs can be kept low given an easy handling and assembly. A replacement bottom housing part 50a can be more inexpensively replaced than an entire valve comprising both upper and lower housing parts 50a, 50b.

Figure 7:
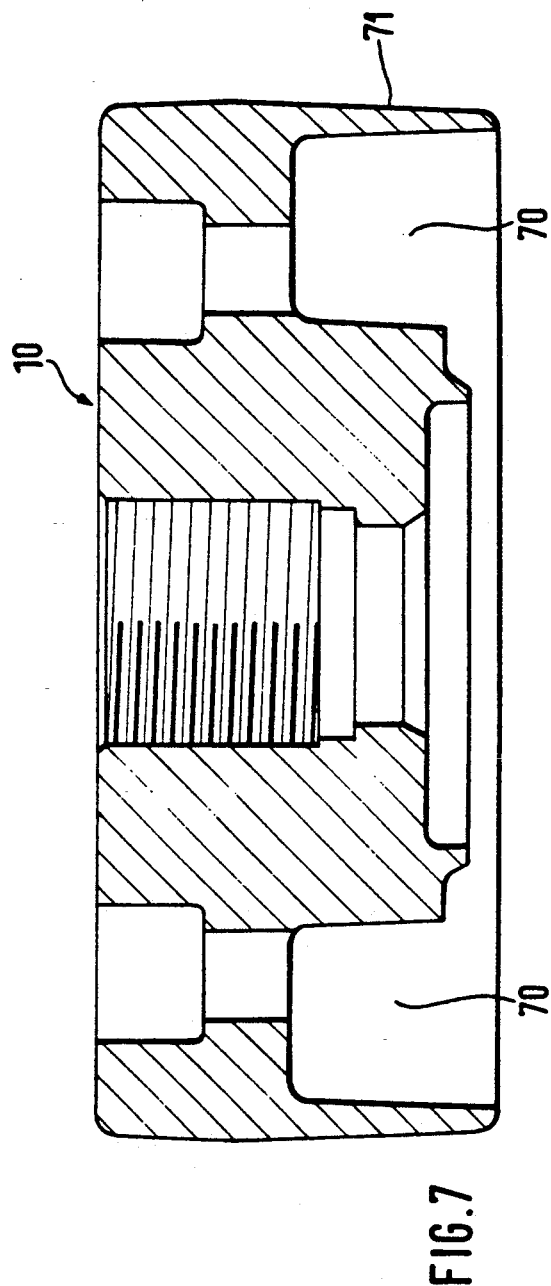
FIG. 7 is a section through another embodiment of the pump head.

Based on the already described features of the invention, long operating times can be achieved without taking off the pump head 10 and cleaning it. Without regular cleaning such long operating time may increase the risk of a corrosion of the pump head, which is nowadays generally manufactured from light metal, particularly when very aggressive paints are used. According to a further embodiment of the invention, the pump head 10 is therefore manufactured from steel, however, as revealed by FIG. 7, provided with recesses 70. In other words, material is only provided where it is necessary for function in order to be able to maintain a weight which is comparable to the conventional light metal pump heads. Expediently, the recesses 70 are located in the interior of the pump head, whereas the outside of the pump head is to remain flat.

Expediently, the outer edge of the pump head 10 is extended in apron-like fashion, whereby this apron 71 reaches over the hydraulic block 12 when the pump head 10 is connected with the hydraulic block 12, as shown in FIG. 2 with respect to a similar plate apron 71a, whereby a clamp-in gap 72 caused by a thickness of the diaphragm 15, is covered and the penetration of dirt therein prevented. Moreover, the annular step 30 of the pump head 10 is shielded from mechanical damaging particularly during manufacturing and transport. Naturally, the hydraulic block 12 can be provided with a protective-apron as well, similar to the apron 71, 71a whereby both aprons then concentrically overlap each other or one of the two aprons has an engagement groove for the other apron.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

We claim:
1. A diaphragm pump comprising:

a first compartment means for receiving a liquid therein and directing said liquid thereout, said compartment means comprising an inlet valve and an outlet valve, at least one of said inlet valve and said outlet valve having manual force activated mechanical means for interfering with and forcing open said one valve when pressed in a first direction, said mechanical means extending to an outside of said compartment means to be engaged by a user;

a spring connected to said mechanical means for returning said mechanical means in a second direction to a non-interfering position;

a diaphragm means for reciprocating in first and second directions for exerting a reciprocating pressing force upon said liquid to cause expulsion of said liquid from said compartment means through said outlet valve; and said one of said inlet valve and said outlet valve being a flow check valve allowing flow therethrough corresponding to a diaphragm movement in said first direction and closing during diaphragm movement in said second direction.

2. A diaphragm pump comprising:

a first compartment means for receiving a liquid therein and directing said liquid thereout, said compartment means comprising an inlet valve and an outlet valve, at least one of said inlet valve and said outlet valve having manual force activated mechanical means for forcing open said one valve, said mechanical means extending to an outside of said compartment means to be engaged by a user;

a diaphragm means for exerting a reciprocating pressind@ force upon said liquid to cause expulsion of said liquid from said compartment means;

wherein said outlet valve comprises a poppet ball covering a valve seat, both ball and seat within a housing of said outlet valve, said poppet ball liftable off said valve seat by fluid pressure from said first liquid, and said mechanical means comprises a spring-loaded valve lifter having a first end facing said poppet ball, said valve lifter protruding through said housing of said outlet valve to an outside of said pump, and terminating in a second end engageable by a user, said valve lifter biased toward non-interference with said poppet ball, force on said second end by the user projects said valve lifter inwardly to engage said poppet ball and further movement lifts said poppet ball off said valve seat.

3. In a diaphragm pump for paint and the like having at least one one-way valve normally openable under fluid pressure from said pump, the improvement comprising:

providing a manually push-activated mechanical means having an elongate rod for interfering with and forcing open said one-way valve for flow-through cleaning when slid in a first direction; and a spring means for returning the elongate rod in a second direction to a position of non-interference with said one-way valve;

said mechanical means extending from said one-way valve to an exterior of said pump to be engageable by a user for transmitting a force from the user to open the one-way valve.

4. The improvement according to claim 3, wherein said one way valve comprises a valve member covering one side of a valve seat and said mechanical means engages said valve member on said one side of said valve seat and exerts a force on said valve member to uncover said valve seat.

5. In a pump for paint and the like having at least one one-way valve, the improvement comprising:

providing a slidable manually push-activated mechanical means for forcing open said one-way valve for flow-through cleaning;

said mechanical means extending from said one-way valve to an exterior of said pump to be engageable by a user for transmitting a force from the user to open the one-way valve;

wherein said one-way valve comprises a poppet ball covering one side of a valve seat, both ball and seat within a housing of said one-way valve, said poppet ball movable off said valve seat by fluid pressure created by said pump, and said mechanical means comprises a spring-loaded valve lifter having a first end facing said poppet ball, said valve lifter protruding through said housing of said one-way valve to an outside of said pump, and terminating in a second end engageable by a user, said valve lifter biased toward non-interference with said poppet ball, force on said second end by the user projects said valve lifter inwardly to engage said poppet ball and further movement moves said poppet ball off said valve seat.

6. The improvement according to claim 5, wherein said first end engages said poppet ball on said one side of said seat covered by said poppet ball.

7. The improvement according to claim 5, wherein said one-way valve can be removed from said pump in a disassembleable fashion from an outside of said pump.

8. The improvement according to claim 5, wherein said valve lifter protrudes through said housing toward said poppet ball along a lifter axis substantially perpendicular to an axis of said flow path through said one-way valve.

9. In a pump for paint and the like having at least one one-way valve, the improvement comprising:

providing a slidable manually push-activated mechanical means for forcing open said one-way valve for flow-through cleaning;

said mechanical means extending from said one-way valve to an outside of said pump engageable by a user for transmitting a force from the user to open the one-way valve; and wherein said one way valve comprises a housing having a valve seat therein and a valve closure member covering said valve seat and removable therefrom by fluid pressure in one flow direction, and closable by fluid pressure in an opposite flow direction, and said manually push-activated mechanical means comprises a rod protruding laterally through said housing in a direction generally perpendicular to said one flow direction, said rod engagable to said valve closure member to unseat said valve closure member from said valve seat.

10. The improvement according to claim 9, wherein said rod is spring loaded away from said valve closure member.

11. The improvement according to claim 10, wherein said valve closure member comprises a ball and said rod is disposed on a same side of said seat that is covered by said ball.

* * * * *